(12) United States Patent
Foo et al.

(10) Patent No.: US 7,840,325 B2
(45) Date of Patent: Nov. 23, 2010

(54) METHOD AND APPARATUS FOR CONTROLLING A FRONT ACTUATABLE RESTRAINING DEVICE USING SIDE SATELLITE SAFING SENSORS

(75) Inventors: Chek-Peng Foo, Ann Arbor, MI (US); Kevin Daniel Weiss, Farmington Hills, MI (US); Christopher John Hibner, Canton, MI (US); Nikhil Bhaskar Mudaliar, Ann Arbor, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 1515 days.

(21) Appl. No.: 11/172,109

(22) Filed: Jun. 30, 2005

(65) Prior Publication Data

US 2007/0005207 A1 Jan. 4, 2007

(51) Int. Cl.
*G06F 7/00* (2006.01)
(52) U.S. Cl. .......................... 701/45; 280/735; 180/282
(58) Field of Classification Search .................. 701/45; 340/436; 280/730.2, 735
See application file for complete search history.

(56) References Cited

U.S. PATENT DOCUMENTS

| | | | |
|---|---|---|---|
| 4,836,024 A | 6/1989 | Woehrl et al. | |
| 5,173,614 A | 12/1992 | Woehrl et al. | |
| 5,737,224 A | 4/1998 | Jeenicke et al. | |
| 5,758,899 A * | 6/1998 | Foo et al. ................ | 280/730.2 |
| 5,900,807 A * | 5/1999 | Moriyama et al. ......... | 340/436 |
| 5,935,182 A * | 8/1999 | Foo et al. ....................... | 701/45 |
| 6,036,225 A | 3/2000 | Foo et al. | |
| 6,095,554 A * | 8/2000 | Foo et al. ..................... | 280/735 |
| 6,186,539 B1 | 2/2001 | Foo et al. | |
| 6,212,454 B1 * | 4/2001 | Foo et al. ....................... | 701/45 |
| 6,249,730 B1 * | 6/2001 | Khairallah et al. ............ | 701/45 |
| 6,300,866 B1 * | 10/2001 | Foith et al. .................. | 340/436 |
| 6,341,252 B1 * | 1/2002 | Foo et al. ....................... | 701/45 |
| 6,520,536 B2 | 2/2003 | Foo et al. | |
| 6,529,810 B2 * | 3/2003 | Foo et al. ....................... | 701/45 |
| 6,553,295 B1 * | 4/2003 | Bauch et al. .................. | 701/45 |
| 6,568,754 B1 * | 5/2003 | Norton et al. .......... | 297/216.12 |
| 6,586,926 B1 * | 7/2003 | Bomya .................. | 324/207.17 |
| 6,640,176 B2 * | 10/2003 | Oswald et al. ................ | 701/45 |
| 6,729,646 B1 * | 5/2004 | Morell ....................... | 280/735 |
| 6,756,889 B2 * | 6/2004 | Sala et al. .................... | 340/436 |
| 6,776,435 B2 | 8/2004 | Foo et al. | |
| 6,811,182 B2 * | 11/2004 | Kobayashi et al. .......... | 280/735 |
| 7,278,657 B1 * | 10/2007 | McCurdy .................... | 280/735 |
| 7,613,568 B2 * | 11/2009 | Kawasaki .................... | 701/301 |
| 7,660,655 B2 * | 2/2010 | Shen .......................... | 701/45 |
| 7,684,914 B2 * | 3/2010 | Hayasaka et al. ............. | 701/45 |
| 7,702,440 B2 * | 4/2010 | Wu et al. ....................... | 701/45 |
| 7,744,123 B2 * | 6/2010 | Foo et al. ..................... | 280/735 |
| 2006/0254848 A1 * | 11/2006 | Foo et al. ..................... | 180/274 |
| 2007/0005207 A1 * | 1/2007 | Foo et al. ....................... | 701/45 |

* cited by examiner

*Primary Examiner*—Thomas G Black
*Assistant Examiner*—Wae Louie
(74) *Attorney, Agent, or Firm*—Tarolli, Sundheim, Covell & Tummino LLP

(57) ABSTRACT

An apparatus (10) for controlling a vehicle actuatable occupant restraining system including a crash accelerometer (32) for sensing frontal crash acceleration and providing a first crash acceleration signal indicative thereof. A side crash accelerometer (46, 48) senses transverse crash acceleration and provides a second crash acceleration signal indicative thereof. A controller (50) actuates the actuatable occupant restraining system in response to the first crash acceleration signal and the transverse crash acceleration signal.

8 Claims, 5 Drawing Sheets

METHOD AND APPARATUS FOR CONTROLLING A FRONT ACTUATABLE RESTRAINING DEVICE USING SIDE SATELLITE SAFING SENSORS

FIELD OF THE INVENTION

The present invention relates to a method and apparatus for controlling a vehicle actuatable occupant restraining device and is particularly directed to a method and apparatus for controlling a front actuatable restraining device using a specific safing function.

BACKGROUND OF THE INVENTION

Air bag restraining systems in vehicles for vehicle occupants are known in the art. An air bag restraining system may include a multistage inflator device where the stages are actuated at different times in response to sensed vehicle crash conditions.

U.S. Pat. No. 5,935,182 to Foo et al., assigned to TRW Inc., discloses a method and apparatus for discriminating a vehicle crash condition using virtual crash sensing. U.S. Pat. No. 6,036,225 to Foo et al., assigned to TRW Inc., discloses a method and apparatus for controlling a multistage actuatable restraining system in a vehicle using crash severity index values. U.S. Pat. No. 6,186,539 to Foo et al., also assigned to TRW Inc., discloses a method and apparatus for controlling a multistage actuatable restraining device using crash severity indexing and crush-zone sensors. U.S. Pat. No. 6,529,810 to Foo et al., also assigned to TRW Inc., discloses a method and apparatus for controlling an actuatable multistage restraining device using switched thresholds based on transverse acceleration.

The use of safing functions in the control of actuatable restraining devices is also known in the art. Early known systems used a discrimination inertia switch and a series connected safing switch. When both the discrimination switch and the safing switch closed, the restraining device was actuated. Other known systems included a crash accelerometer, a discrimination algorithm for analyzing the crash accelerometer output signal, and a sating switch. When the discrimination algorithm determined a deployment crash event was occurring and the safing switch closed, the restraining device was actuated. Still other known systems used a discrimination crash acceleration sensor oriented in a direction of expected crash and a safing crash acceleration sensor oriented in the same direction. Associated algorithms process the signals from the two sensors and control the restraint when both determined a deployment crash event was occurring.

SUMMARY OF THE INVENTION

The present invention is directed to a method and apparatus for controlling a frontal actuatable occupant restraining system using side satellite safing sensors.

An apparatus for controlling a vehicle actuatable occupant restraining system comprising a crash accelerometer for sensing frontal crash acceleration and providing a first crash acceleration signal indicative thereof. A side crash accelerometer senses transverse crash acceleration and provides a second crash acceleration signal indicative thereof. A controller actuates the actuatable occupant restraining system in response to the first crash acceleration signal and the transverse crash acceleration signal.

A method is provided for controlling a vehicle actuatable occupant restraining system comprising the steps of sensing frontal crash acceleration and providing a first crash acceleration signal indicative thereof, sensing transverse crash acceleration and providing a second crash acceleration signal indicative thereof, and actuating the actuatable occupant restraining system in response to the first crash acceleration signal and the transverse crash acceleration signal.

BRIEF DESCRIPTION OF THE DRAWINGS

The foregoing and other features and advantages of the invention will become apparent to one skilled in the art upon consideration of the following description of the invention and the accompanying drawings in which.

DESCRIPTION OF PREFERRED EMBODIMENTS

Figure 1:
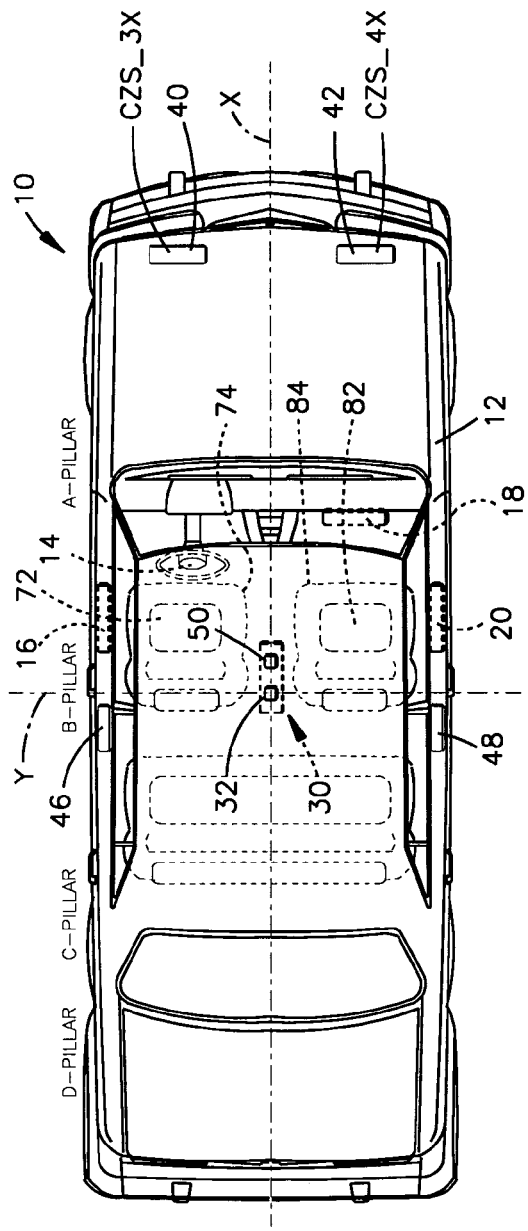
FIG. 1 is a schematic diagram of a vehicle having an actuatable occupant restraining system in accordance with an exemplary embodiment of the present invention.
Figure 2:
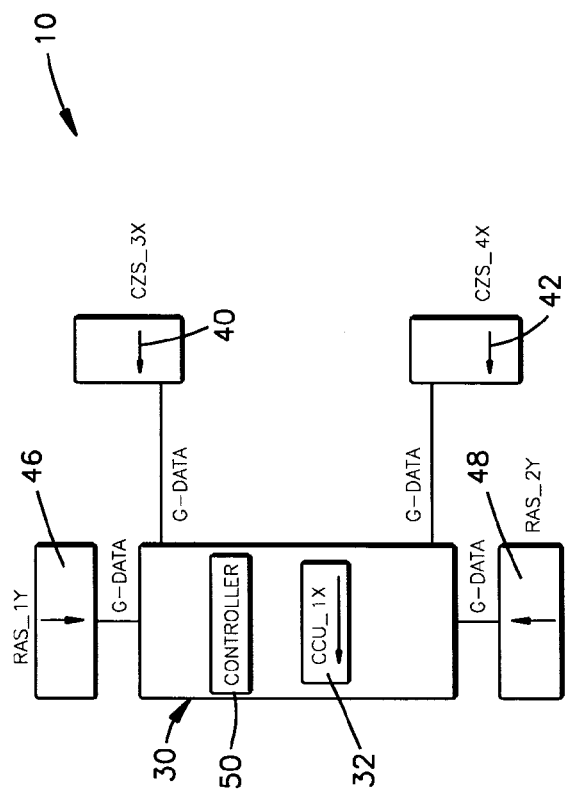
FIG. 2 is a schematic block diagram of a portion of the actuatable occupant restraining system shown in FIG. 1 in more detail.
Figure 3:
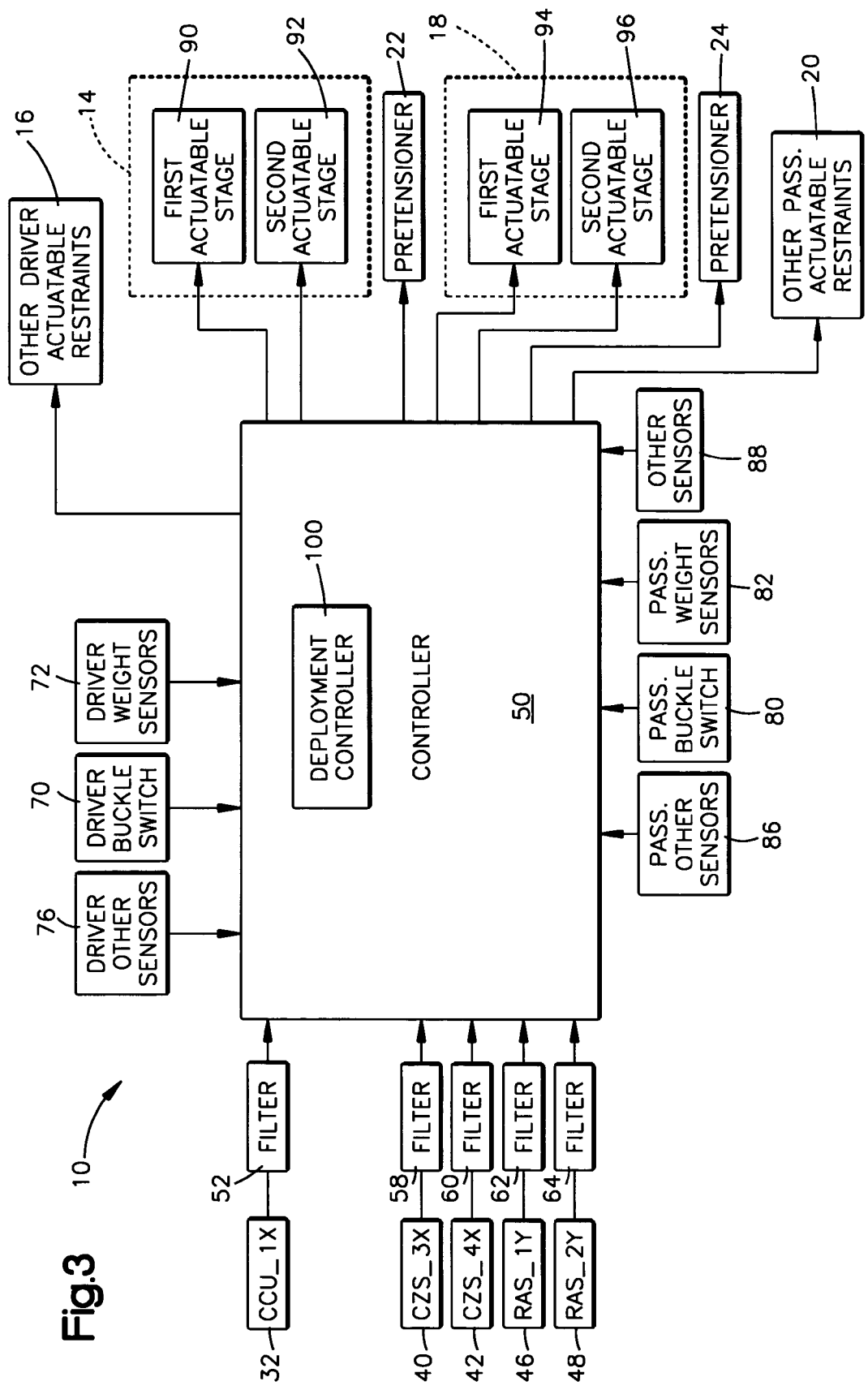
FIG. 3 is an electrical schematic block diagram of the actuatable occupant restraining system shown in FIG. 1.

Referring to FIGS. 1-3, an actuatable occupant restraining system 10, in accordance with an exemplary embodiment of the present invention, for use in a vehicle 12, includes a driver's side, multistage, front actuatable restraining device 14, and a passenger's side, multistage, front actuatable restraining device 18. Other actuatable restraining devices could be included such as a driver's actuatable side restraining device 16 and a passenger's actuatable side restraining device 20. The actuatable occupant restraining system 10 could further include a driver's side pretensioner 22, and a passenger's side pretensioner 24. The present invention is not limited to use with a multistage air bag restraining system responsive to frontal crash events. The present invention is applicable to any actuatable restraining device triggered in response to a frontal crash event. A front air bag having plural actuatable stages is described here for purposes of explanation.

The system 10 includes a central control unit ("CCU") 30 located at a substantially central location of the vehicle. In accordance with an exemplary embodiment, CCU 30 includes a crash acceleration sensor 32 having its axis of sensitivity substantially oriented to sense crash acceleration in the vehicle X-direction (i.e., parallel with or substantially parallel with the front-to-rear axis of the vehicle) that provides a crash acceleration signal designated herein as CCU_1X. The crash acceleration signal from the crash sensor 32 can take any of several forms. The crash acceleration signal can have amplitude, frequency, pulse duration, etc., or any other electrical characteristic(s) that varies as a function of the sensed crash acceleration. In accordance with a preferred embodiment, the crash acceleration signal CCU_1X has frequency and amplitude characteristics indicative of the sensed crash acceleration.

In addition to the crash acceleration sensor 32, the system 10 includes forwardly located, crush-zone satellite acceleration sensors ("CZS") 40 and 42 located in a crush-zone location of the vehicle 12. The crush-zone sensor 40 is located on the driver's side of the vehicle and has an XY-axis of sensitivity substantially oriented to sense crash acceleration parallel with the vehicle's X-axis, i.e., front-to-rear axis. The crush-zone sensor 42 is located on the passenger's side of the vehicle and has an axis of sensitivity substantially oriented to sense crash acceleration parallel with the vehicle's X-axis, i.e., front-to-rear axis. The signal from the driver's side, crush-zone sensor 40 is designated herein as CZS_3X. The signal from the passenger's side, crush-zone sensor 42 is designated herein as CZS_4X.

The signals from the crush-zone sensors 40 and 42 also have frequency and amplitude characteristics indicative of the crash acceleration experienced and sensed by those sensors at those sensor locations of the vehicle. The crush-zone sensors 40, 42 are in one exemplary embodiment mounted at or near the radiator location of the vehicle and serve a twofold purpose. First, they serve to provide a safing function in frontal crash events using the CCU_1X sensor as the main discriminatory sensor in accordance with the present invention. Also, the crush-zone sensors function in selecting the thresholds to be evaluated in the main crash discrimination algorithm.

A driver's side-satellite crash acceleration sensor ("RAS") 46 is mounted on the driver's side of the vehicle such as at the B-pillar and has its axis of sensitivity substantially oriented to sense crash acceleration parallel with the vehicle's Y-axis, i.e., substantially perpendicular to the vehicles front-to-rear axis. The crash acceleration sensor 46 provides a crash acceleration signal designated herein as RAS_1Y having frequency and amplitude characteristics indicative of crash acceleration in the Y-axis direction with acceleration into the driver's side of the vehicle having a positive value.

A passenger's side-satellite crash acceleration sensor ("RAS") 48 is mounted on the passenger's side of the vehicle such as at the B-pillar and has its axis of sensitivity substantially oriented to sense crash acceleration parallel with the vehicle's Y-axis, i.e., substantially perpendicular to the vehicles front-to-rear axis. The crash acceleration sensor 48 provides a crash acceleration signal designated herein as RAS_2Y having frequency and amplitude characteristics indicative of crash acceleration in the Y-axis direction with acceleration into the passenger's side of the vehicle having a positive value. In accordance with the present invention, the side satellite sensors 46, 48 provide a safing function for frontal crash events. It will be appreciated that the sensors 46, 48 may be used to control the side restraints 16, 20 in accordance with known algorithms such as U.S. Pat. No. 5,758,899 to Foo et al.

The crash acceleration signals CCU_1X, CZS_3X, CZS_4X, RAS_1Y; and RAS_2Y are provided to a controller 50 in the CCU 30, through associated hardware, high-pass/low-pass filters 52, 58, 60, 62, and 64, respectively. The controller 50 may be a microcomputer. Although a microcomputer is described in this exemplary embodiment, the invention is not limited to the use of a microcomputer for a controller. The present invention contemplates that the functions performed by the controller could be carried out by other digital and/or analog circuitry and/or could be assembled on one or more circuit boards and/or as an application specific integrated circuit ("ASIC").

The filters 52, 58, 60, 62, and 64, filter their associated crash acceleration signals to remove frequency components that are not useful in analyzing and evaluation of a vehicle crash event, e.g., frequency components resulting from road noise. Frequencies useful for crash evaluation and analysis can be determined through empirical testing of a vehicle platform of interest.

The controller 50 monitors the filtered crash acceleration signals and performs one or more crash algorithms to determine whether a vehicle deployment or non-deployment crash event is occurring. Each crash algorithm measures and/or determines values of the crash event from the crash acceleration signals. These values are used in deployment and actuation decisions. Such measured and/or determined crash values are referred to herein as "crash metrics" and include but are not limited to crash acceleration, crash energy, crash velocity, crash displacement, crash jerk, etc. Based upon the crash acceleration signals, the controller 50, in accordance with the present invention, controls the actuatable restraining devices 14, 18.

Other driver associated sensors could be used to detect characteristics of the driver (for the driver's side restraints) and provide inputs used by the controller 50 in its control algorithm to control the actuatable restraining devices 14 and 16. These sensors could include a driver's buckle switch sensor 70 that provides a signal to controller 50 indicating whether the driver has his seatbelt buckled. Driver's weight sensors 72 located in the driver's seat 74 provide a signal indicative of the driver's sensed weight. Other driver associated sensors 76 provide other driver related information to the controller 50 such as position, height, girth, movement, etc. The sensors 76 may take the form of cameras, infrared sensors, ultrasonic sensors, etc. All of this information is further useful in the control of the driver's associated restraining device(s).

Other passenger associated sensors could be used to detect characteristics of the passenger and provide inputs for the controller 50 in its control algorithm to control the actuatable restraining devices 18 and 20. These sensors could include a passenger's buckle switch sensor 80 that provides a signal to controller 50 indicating whether the passenger has his seatbelt buckled. Passenger's weight sensors 82 located in the passenger's seat 84 provide a signal indicative of the passenger's sensed weight. Other passenger associated sensors 86 provide other occupant information to the controller 50 related to the passenger such as position, height, girth, movement, etc. The sensors 86 may take the form of cameras, infrared sensors, ultrasonic sensors, etc. Other sensors 88 provide signals to the controller 50 indicative of whether a passenger is present on the seat 84, whether a child restraining seat is present on the seat 84, etc. The sensors 88 may take the form of cameras, infrared sensors, ultrasonic sensors, etc., also. All of this information is further useful in the control of the passenger's associated restraining device(s).

In accordance with an exemplary embodiment of the present invention, the air bag restraining device 14 includes a first actuatable stage 90 and a second actuatable stage 92, e.g., two separate sources of inflation fluid in fluid communication with a single air bag restraining device 14. Each stage 90, 92, has an associated squib (not shown) that, when energized with sufficient current for a sufficient time period, initiates fluid flow from an associated fluid source. When one stage is actuated, a percentage less than 100% of the maximum possible inflation of the air bag restraining device 14 occurs. To achieve 100% inflation, the second stage must be actuated within a predetermined time of the first stage actuation. More specifically, the controller 50 performs a crash algorithm using determined crash metrics and outputs one or more signals to the actuatable restraining device 14 for effecting actuation of one or both actuatable inflation stages 90 and 92 at times to achieve a desired inflation profile and pressure. As mentioned, other actuatable restraining devices such as a pretensioner 22, or other devices such as side restraining devices 16 would also be controlled.

As mentioned, each of the actuatable stages 90, 92 includes an associated squib (not shown) of the type well known in the art. Each squib is operatively connected to an associated source of gas generating material and/or a bottle of pressurized gas. The squibs are ignited by passing a predetermined amount of electrical current through them for a predetermined time period. Each squib ignites its associated gas generating material and/or pierces its associated pressurized gas bottle. The amount of gas released into the bag is a direct function of the number of stages actuated and the timing of their actuation. The more stages actuated during predetermined time periods, the more gas present in the air bag. In accordance with an exemplary embodiment, the air bag restraining device 14 includes two actuatable stages. If only one stage is actuated, less than 100% of the maximum possible inflation pressure occurs. If the two stages are actuated within 5 msec. of each other, 100% of the maximum possible inflation pressure occurs. If the stages are actuated approximately 20 msec. apart, a different, lesser percentage of the maximum possible inflation occurs. By controlling the actuation timing of the multiple stages, the dynamic profile of the bag is controlled, e.g., the inflation rate, the inflation pressure, etc.

The passenger's side restraining device 18 includes a first actuatable stage 94 and a second actuatable stage 96 controlled as described above with regard to the driver's side restraining device 14 to control the inflation profile/inflation pressure of the air bag.

In accordance with the present invention, a deployment controller 100 within the controller 50 controls the actuation of the first actuatable stages 90, 94 and second actuatable stages 92, 96 using determined crash metrics and other monitored sensor inputs.

Figure 4:
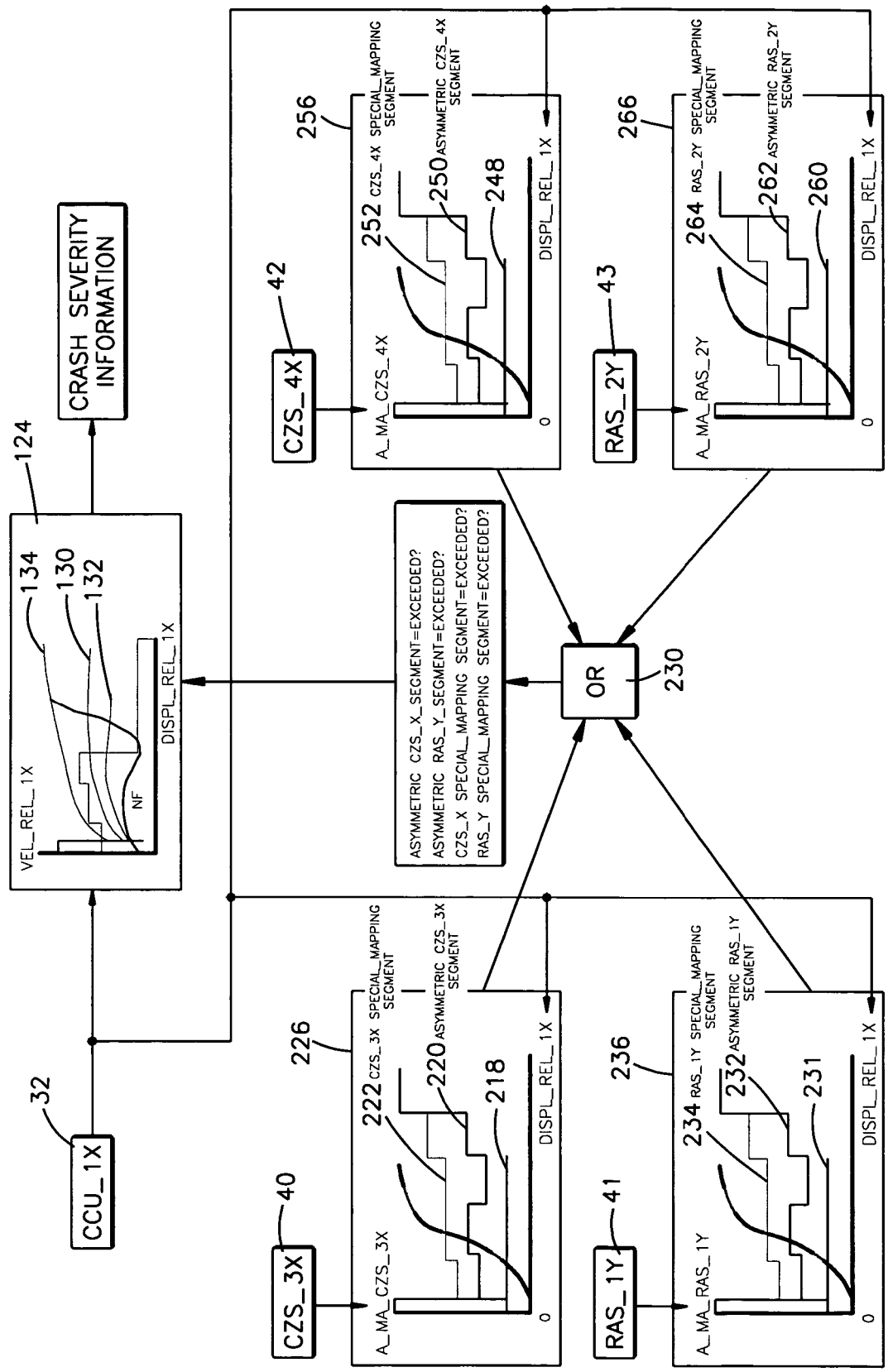
FIG. 4 shows graphical representations of determined crash related values and thresholds used in an exemplary embodiment of the present invention.
Figure 5:
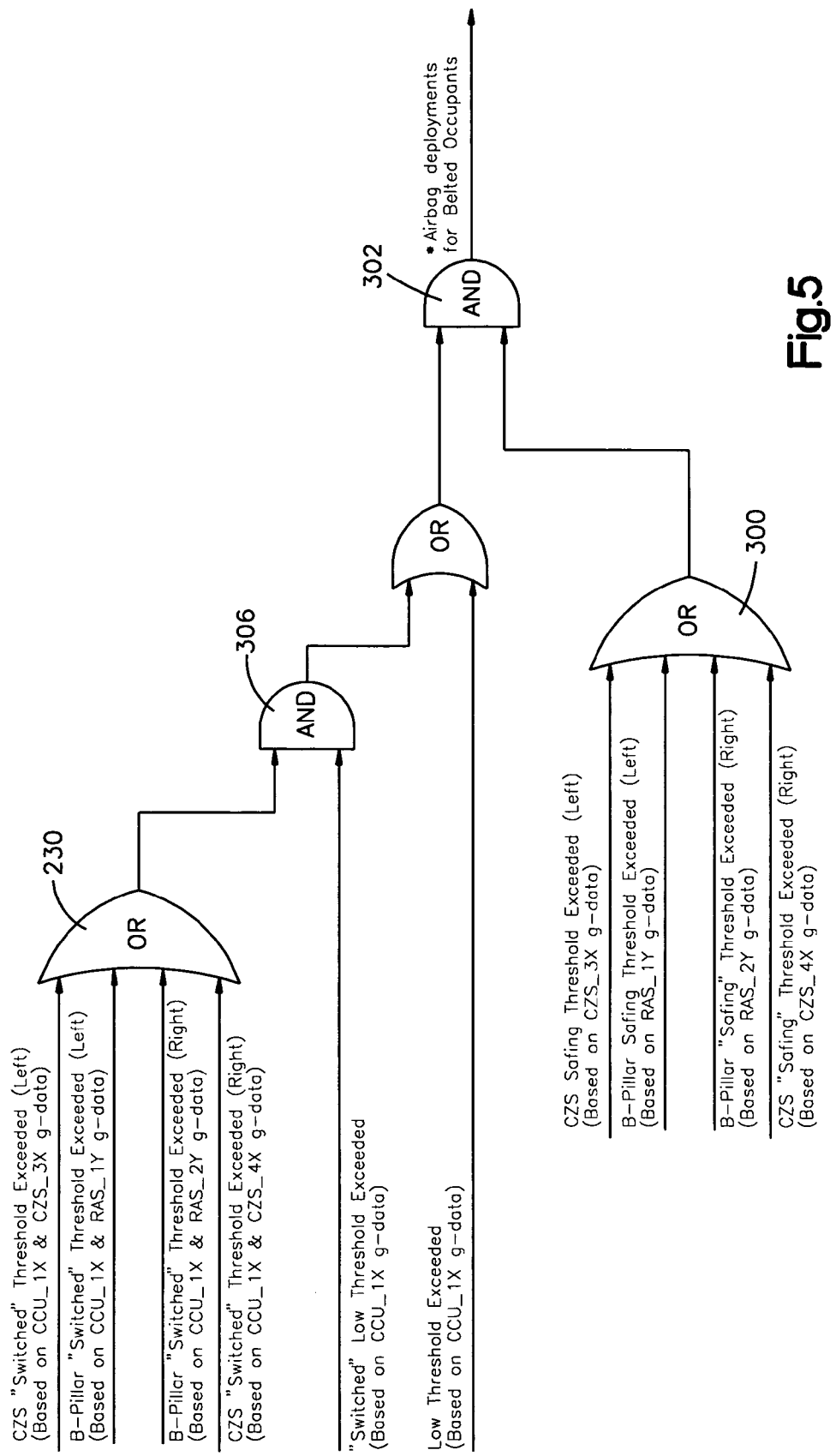
FIG. 5 is a logic diagram showing deployment control logic in accordance with an exemplary embodiment of the present invention.

Referring to FIGS. 4 and 5, a control process performed by the controller 50 to control actuation of the first and second stages will be better understood for the driver's side, multistage restraining device 14. It should be understood that the passenger's side, multistage restraining device 18 is similarly controlled. As mentioned, the controller 50 is, in accordance with an exemplary embodiment, a microcomputer programmed to perform these described and illustrated functions.

The acceleration sensor 32, an accelerometer in an exemplary embodiment, outputs the acceleration signal CCU_1X having a characteristic (e.g., frequency and amplitude) indicative of the vehicle's crash acceleration upon the occurrence of a crash event. Since the axis of sensitivity of the accelerometer is oriented substantially parallel with the front-to-rear axis of the vehicle, the sensor 32 is particularly sensitive to crash events in the forward direction. The acceleration signal CCU_1X is filtered by, in the exemplary embodiment, a hardware (i.e., separate from the controller 50) high-pass-filter ("HPF")/low-pass-filter ("LPF") 52 to eliminate frequencies resulting from extraneous non-crash vehicle operating events and/or input signals resulting from such things as road noise. The frequency components removed through filtering are not indicative of the occurrence of a crash event for which deployment of the restraining device 14 is desired. Empirical testing is used to determine the frequency values of relevant crash signals for a particular vehicle platform of interest under a variety of crash conditions. Extraneous signal components that may be present in the crash acceleration signal not indicative of a crash event are appropriately filtered and signal characteristics indicative of a deployment crash event are passed for further processing.

The accelerometer 32, in accordance with an exemplary embodiment, has a nominal sensitivity of ±100 g's (g being the value of acceleration due to earth's gravity, i.e., 32 feet per second squared or 9.8 m/s$^2$). In a multistage actuatable restraining system, it is desirable to continue sensing crash acceleration during the crash event, even after a first or initial trigger threshold is reached. Since a first stage actuation is desired upon the occurrence of crash acceleration well within ±100 g's, the further need for sensing is facilitated with the accelerometer 32 having a nominal sensitivity of ±100 g's.

The filtered output signal from accelerometer 32 is provided to an analog-to-digital (converter), that is, in an exemplary embodiment, internal to the controller 50 (e.g., an A/D input of a microcomputer) or could be to an external A/D converter. The A/D converter converts the filtered crash acceleration signal CCU_1X into a digital signal. The output of the A/D converter is filtered, in the exemplary embodiment, with another high-pass/low-pass filter having filter values empirically determined for the purpose of eliminating small drifts and offsets associated with the A/D conversion. In a microcomputer embodiment of the present invention, the filter could be digitally implemented within the microcomputer. A determination function of the controller 50 determines two crash metric values Vel_Rel_1X ("crash velocity") and Displ_Rel_1X ("crash displacement") from the filtered crash acceleration signal CCU_1X. These metric values are determined by first and second integrations of the acceleration signal from CCU_1X.

The crash displacement value and crash velocity value may be determined using a virtual crash sensing process as described in U.S. Pat. No. 6,186,539 to Foo et al. and U.S. Pat. No. 6,036,225 to Foo et al. using a spring mass model of the occupant to account for spring forces and damping forces. A detailed explanation of a spring-mass model is found in U.S. Pat. No. 5,935,182 to Foo et al.

The crash metric values determined in crash velocity and crash displacement determination functions are used to compare the Vel_Rel_1X value as a function of Displ_Rel_1X against crash displacement varying thresholds in a comparison function of the controller 50. The comparison function 124 compares the Vel_Rel_1X value against a LOW threshold 130 and a SWITCHED LOW threshold 132 and also compares the Vel_Rel_1X value against a HIGH threshold 134. Crossing of the thresholds 130 or 132 is the discrimination portion of what controls actuation of the first stage 90 of the restraining device 14. Which one of the two low thresholds 130 and 132 that is selected for discrimination control of the deployment of the first stage actuation 90 of the restraining device 14 is controlled in response to a determined CZS value in the X direction compared against an associated threshold values (referred to herein as asymmetric CZS segment value that varies as a function of the Displ_Rel_1X value) or a determined RAS value in the Y direction compared against an associated threshold value (referred to herein as asymmetric RAS segment value that varies as a function of the Displ_Rel_1X value) as discussed below. The control of the first stage actuation is further controlled in response to the crossing of a safing threshold value by at least one of CZS_3X, CZS_4X, RAS_1Y, or RAS_2Y.

Figure 6:
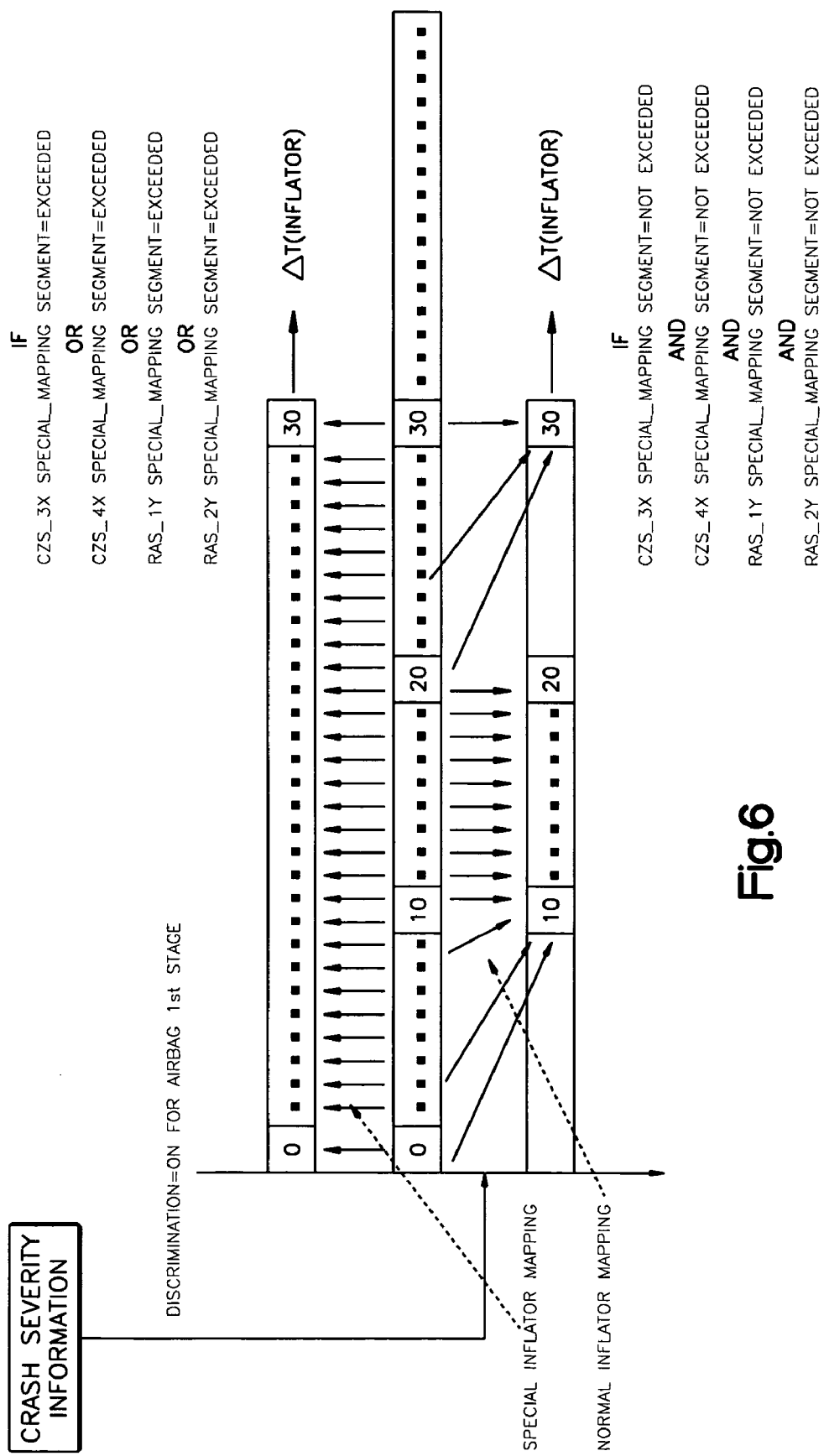
FIG. 6 is a diagram showing inflator mapping in accordance with an exemplary embodiment of the present invention.

Assuming the safing function is satisfied, the second stage 92 is actuated as a function of the time between a LOW (or SWITCHED LOW) threshold crossing and a HIGH threshold crossing (134) and in accordance with a predetermined inflator mapping function shown in FIG. 6. All three thresholds 130, 132, and 134 vary as a function of the crash displacement Displ_Rel_1X value and are empirically determined for a particular vehicle platform of interest.

In particular, the controller 50 determines the time period from when the determined crash velocity value Vel_Rel_1X crosses the LOW threshold 130 or the SWITCHED LOW threshold 132 to when it exceeds the HIGH threshold 134. This time period is referred to herein as the "Δt measurement". This time period is a measure of the crash intensity. The shorter the time period Δt, the more intense the vehicle crash. It is this measure of Δt that is used in the control actuation of the second stage 92. The second stage is not necessarily deployed at the time of the HIGH threshold crossing, but as a function of the Δt measurement in accordance with an inflator mapping function as described below and shown in FIG. 6. Again, this assumes actuation of the first stage because of both crossing of the threshold 130 or 132 and a TRUE of the safing function, i.e., the first stage is actuated.

In accordance with the present invention, the crush-zone sensors 40 or 42 or the side satellite sensors 41 or 43 detection of one of a plurality of a certain types of crash events can select the switched LOW threshold 132 rather than the LOW threshold value 130 for discrimination control of the deployment of the first stage 90.

The crush-zone sensor 40 provides signal CZS_3X having signal characteristics (e.g., frequency and amplitude) indicative of the vehicle's crash acceleration upon the occurrence of a crash event as sensed at the forward, front left location of the vehicle in the direction along the vehicle's X axis. The acceleration signal CZS_3X is filtered by, in one exemplary embodiment, a hardware high-pass-filter ("HPF")/low-pass-filter ("LPF") 58 to eliminate frequencies resulting from extraneous vehicle operating events and/or inputs resulting from road noise. The frequency components removed through filtering are those frequencies not indicative of the occurrence of a crash event. Empirical testing is used to establish a frequency range or ranges of the relevant crash signals so that extraneous signal components present in the crash acceleration signal can be filtered and frequencies indicative of a crash event passed for further processing.

The filtered output signal is provided to an associated analog-to-digital ("A/D") converter that may be internal to the controller 50 (e.g., an A/D input of a microcomputer) or an external A/D converter. The A/D converter converts the filtered crash acceleration signal CZS_3X into a digital signal. The output of the A/D converter is further filtered with high-pass/low-pass filters having values empirically determined for the purpose of eliminating small drifts and offsets resulting from the conversion. In a microcomputer embodiment of the present invention, the filter would be digitally implemented within the microcomputer. The filtering functions provide filtered acceleration signal CSZ_3X.

The controller 50 determines acceleration value designated A_MA_CZS_3X from the CZS_3X signal. This value is determined by calculating moving average value of the associated filtered acceleration signal from the crush-zone sensor 40. A moving average is a sum of the last predetermined number of samples of the filtered acceleration signal. The average is updated by removing the oldest value, replacing it with the latest sample, and then determining the new average.

The determined crush-zone sensor acceleration value A_MA_CZS_3X is first compared against a safing threshold 218 by a comparison function 226. When A_MA_CZS_3X crosses the safing threshold 218, a safing flag is set TRUE. The safing flag of controller 50 must be true before the first stage actuation can occur.

The determined crush-zone sensor acceleration value A_MA_CZS_3X as a function of the determined displacement value Displ_Rel_1X is next compared against an asymmetric CZS_3X segment threshold 220, and a CZS_3X special mapping segment threshold 222 in the threshold comparison function 226. The threshold 222 and the threshold 220 vary as a function of Displ_Rel_1X in a predetermined manner to achieve a desired control. The thresholds 220, 222 may be determined empirically for a particular vehicle platform of interest. The result of the comparison function 226 is output to an ORing function 230.

The side satellite sensor 41 provides signal RAS_1Y having characteristics (e.g., frequency and amplitude) indicative of the vehicle's crash acceleration upon the occurrence of a crash event in the direction along the vehicle's Y axis. Even during a frontal crash event, the sensor RAS_1Y will output a signal that can be used for the safing purposes. The acceleration signal RAS_1Y is filtered by, in an exemplary embodiment, a hardware high-pass-filter ("HPF")/low-pass-filter ("LPF") 62 to eliminate frequencies resulting from extraneous vehicle operating events and/or inputs resulting from road noise. The frequency components removed through filtering are those frequencies not indicative of the occurrence of a crash event. Empirical testing is used to establish a frequency range or ranges of the relevant crash signals so that extraneous signal components present in the crash acceleration signal can be filtered and frequencies indicative of a crash event passed for further processing.

The filtered output signal is provided to an associated analog-to-digital ("A/D") converter that may be internal to the controller 50 (e.g., an A/D input of a microcomputer) or an external A/D converter. The A/D converter converts the filtered crash acceleration signal RAS_1Y into a digital signal. The output of the A/D converter is further filtered with high-pass/low-pass filters having values empirically determined for the purpose of eliminating small drifts and offsets resulting from the conversion. In a microcomputer embodiment of the present invention, the filter would be digitally implemented within the microcomputer. The filtering functions provide filtered acceleration signal RAS_1Y.

The controller 50 determines acceleration value designated A_MA_RAS_1Y from the RAS_1Y signal. This value is determined by calculating moving average value of the associated filtered acceleration signal from the side satellite sensor 41. A moving average is a sum of the last predetermined number of samples of the filtered acceleration signal. The average is updated by removing the oldest value, replacing it with the latest sample, and then determining the new average.

The determined satellite sensor acceleration value A_MA_RAS_1Y is first compared against a safing threshold 231 by a comparison function 236. When A_MA_RAS_1Y crosses the safing threshold 231, a safing flag is set TRUE. The safing flag of controller 50 must be true before the first stage actuation can occur.

The determined satellite sensor acceleration value A_MA_RAS_1Y as a function of the determined displacement value Displ_Rel_1X is compared against an asymmetric RAS_1Y segment threshold 232 and a RAS_1Y special mapping segment threshold 234 in the threshold comparison function 236. The threshold 232 and the threshold 234 vary as a function of Displ_Rel_1X in a predetermined manner to achieve a desired control. The thresholds 232, 234 may be determined empirically for a particular vehicle platform of interest. The result of the comparison function 236 is output to the ORing function 230.

The crush-zone sensor 42 is an accelerometer providing a signal CZS_4X having characteristics (e.g., frequency and amplitude) indicative of the vehicle's crash acceleration in the X directions upon the occurrence of a crash event as sensed at the forward, front right location of the vehicle. The acceleration signal CZS_4X is filtered by, in one exemplary embodiment, a hardware high-pass-filter ("HPF")/low pass filter ("LPF") 60 to eliminate frequencies resulting from extraneous vehicle operating events and/or inputs resulting from road noise. The acceleration signal CZS_4X is filtered by, in one exemplary embodiment, a hardware high-pass-filter ("HPF")/low pass filter ("LPF") 60 to eliminate frequencies resulting from extraneous vehicle operating events and/or inputs resulting from road noise. The frequency components removed through filtering are those frequencies not indicative of the occurrence of a crash event. Empirical testing is used to establish a frequency range or ranges of the relevant crash signals so that extraneous signal components present in the crash acceleration signal can be filtered and frequencies indicative of a crash event passed for further processing.

The filtered output signal is provided to an associated analog-to-digital ("A/D") converter that may be internal to the controller 50 (e.g., an A/D input of a microcomputer) or an external A/D converter. The A/D converter converts the filtered crash acceleration signal into a digital signal. The output of the A/D converter is filtered in one exemplary embodiment with high-pass/low-pass filter having filter values empirically determined for the purpose of eliminating small drifts and offsets resulting from the conversion. In a microcomputer embodiment of the present invention, the filter would be digitally implemented within the microcomputer. The filtering function outputs filtered acceleration signals CSZ_4X.

The controller 50 determines acceleration values designated A_MA_CZS_4X. This value is determined by calculating a moving average value of the filtered acceleration signal of the crush-zone sensors 42. A moving average is a sum of the last predetermined number of samples of the filtered acceleration signal. The average is updated by removing the oldest value, replacing it with the latest sample, and then determining the new average.

The determined crush-zone sensor acceleration value A_MA_CZS_4X is first compared against a safing threshold 248 by a comparison function 256. When A_MA_CZS_4X crosses the safing threshold 248, a safing flag is set TRUE. The safing flag of controller 50 must be true before the first stage actuation can occur.

This determined crush-zone sensor acceleration value A_MA_CZS_4X as a function of the determined displacement value Displ_Rel_1X is compared against an asymmetric CZS_4X segment threshold 250 and a special-mapping segment threshold 252 in a threshold comparison function 256 of the controller 50. The threshold 252 and the threshold 250 vary as a function of Displ_Rel_1X in a predetermined manner to achieve a desired control. The thresholds 250, 252 may be determined empirically for a particular vehicle platform of interest. The result of the comparison from the comparison function 256 is an input to the ORing function 230.

The side satellite sensor 43 provides signal RAS_2Y having characteristics (e.g., frequency and amplitude) indicative of the vehicle's crash acceleration upon the occurrence of a crash event in the direction along the vehicle's Y axis. Even during a frontal crash event, the sensor RAS_2Y will output a signal that can be used for the safing purposes. The acceleration signal RAS_2Y is filtered by, in an exemplary embodiment, a hardware high-pass-filter ("HPF")/low-pass-filter ("LPF") 64 to eliminate frequencies resulting from extraneous vehicle operating events and/or inputs resulting from road noise. The frequency components removed through filtering are those frequencies not indicative of the occurrence of a crash event. Empirical testing is used to establish a frequency range or ranges of the relevant crash signals so that extraneous signal components present in the crash acceleration signal can be filtered and frequencies indicative of a crash event passed for further processing.

The filtered output signal is provided to an associated analog-to-digital ("A/D") converter that may be internal to the controller 50 (e.g., an A/D input of a microcomputer) or an external A/D converter. The A/D converter converts the filtered crash acceleration signal RAS_2Y into a digital signal. The output of the A/D converter is further filtered with high-pass/low-pass filters having values empirically determined for the purpose of eliminating small drifts and offsets resulting from the conversion. In a microcomputer embodiment of the present invention, the filter would be digitally implemented within the microcomputer. The filtering functions provide filtered acceleration signal RAS_2Y.

The controller 50 determines acceleration value designated A_MA_RAS_2Y from the RAS_2Y signal. This value is determined by calculating moving average value of the associated filtered acceleration signal from the side satellite sensor 43. A moving average is a sum of the last predetermined number of samples of the filtered acceleration signal. The average is updated by removing the oldest value, replacing it with the latest sample, and then determining the new average.

The determined satellite sensor acceleration value A_MA_RAS_2Y is first compared against a safing threshold 220 by a comparison function 266. When A_MA_RAS_2Y crosses the safing threshold 266, a safing flag is set TRUE. The safing flag of controller 50 must be true before the first stage actuation can occur.

The determined satellite sensor acceleration value A_MA_RAS_2Y as a function of the determined displacement value Displ_Rel_1X is next compared against an asymmetric RAS_2Y segment threshold 262 and a RAS_2Y special mapping segment threshold 264 in a threshold comparison function 266. The threshold 262 and the threshold 264 vary as a function of Displ_Rel_1X in a predetermined manner to achieve a desired control. The thresholds 262, 264 may be determined empirically for a particular vehicle platform of interest. The result of the comparison function 266 is output to the ORing function 230.

With the ORing function 230, the controller 50 controls which threshold 130 or 132 is used to actuate the first stage deployment. If none of the determined values A_MA_CZS_3X, A_MA_RAS_1Y, A_MA_CZS_4X, OR A_MA_RAS_2Y cross their associated thresholds 220 (Asymmetric CZS_3X Segment), 232 (Asymmetric RAS_1Y Segment), 250 (Asymmetric CZS_4X Segment), OR 262 (Asymmetric RAS_2Y Segment), then threshold 130 is used. If any of them cross their associated thresholds, then the threshold 132 is used. The threshold 130 is also referred to herein as the Symmetric CCU 1$^{st}$ Stage Threshold.

Referring to FIG. 5, the logic process used by controller 50 is depicted to initiate a first stage deployment. As can be seen, if any of the CZS_3X OR CZS_4X OR RAS_1Y OR RAS_2Y safing comparisons crosses their associated thresholds, the ORing function 300 is TRUE or, HIGH. If (1) the output of the ORing function 300 is HIGH AND (ANDing function 302) (2) the VEL_REL_1X value exceeds the low threshold 130, the first stage is actuated. If (1) the output of the ORing function 300 is HIGH AND (2) (a) if any of the CZS_3X OR CZS_4X OR RAS_1Y OR RAS_2Y values exceed their associated switching thresholds 220, 250, 232, or 262 (all by ORing function 230), AND (ANDing function 306) (b) the switched low CCU_1X threshold 132 is exceeded by VEL_REL_1X, the first stage is actuated. Second stage deployment is based on the time for crossing the second threshold 134 and the inflator mapping shown in FIG. 6.

Referring to FIG. 6, mapping for control of second stage deployment is shown for an exemplary embodiment of the present invention. Two inflator mappings exist for this exemplary embodiment. A normal inflator map and a special inflator map. The inflator map is selected in response to the CZS values, the RAS values, and the comparisons in functions 226, 236, 256, and 266. If all of the A_MA_CZS_3X, A_MA_RAS_1Y, A_MA_CZS_4X, OR A_MA_RAS_2Y values as a function of Disp_Rel_1X are below the special mapping thresholds 222, 234, 252, and 264, respectively, then the normal inflator mapping is used. If any of the A_MA_CZS_3X, A_MA_CZS_3Y, A_MA_CZS_4X, OR A_MA_CZS_4Y values as a function of Disp_Rel_1X is greater than the special mapping thresholds 222, 234, 252, and 264, respectively, then the special inflator mapping is used.

In the special-mapping, one-to-one timing occurs between the crossing of the second threshold and the deployment signal for the second actuation from 1-30 milliseconds. In the normal mapping, actuation of the second stage would occur 10 milliseconds after the first stage actuation if the second threshold crossing was between 1-10 milliseconds of the first stage crossing, a one-to-one timing control is used between 10-20 milliseconds, and second stage deployment occurs 30 milliseconds after first stage actuation if the second crossing occurred between 21-30 milliseconds after the first stage deployment occurred.

Other sensors 88 could be used to make further control adjustments in the actuation. For example, if a rearward facing child seat is detected on the passenger's seat 84, actuation of the first and second stages 94, 96 could be prevented.

From the above description of the invention, those skilled in the art will perceive improvements, changes and modifications. Such improvements, changes, and/or modifications within the skill of the art are intended to be covered by the appended claims.

Having described the invention, the following is claimed:

1. An apparatus for controlling a vehicle actuatable occupant restraining system comprising:
a crash accelerometer for sensing frontal crash acceleration and providing a first crash acceleration signal indicative thereof;
a side crash accelerometer sensing transverse crash acceleration and providing a second crash acceleration signal indicative thereof; and
a controller determining a crash velocity value and a crash displacement value in response to the first crash acceleration signal, comparing the determined crash velocity value as a function of crash displacement value against a threshold value selected as a function of said second crash acceleration value, said controller actuating the actuatable occupant restraining system in response to the comparison of the determined crash velocity value as a function of the crash displacement value against the selected threshold value.

2. The apparatus of claim 1 further including a crush-zone sensor located in a crush-zone location of the vehicle, said controller actuating said actuatable occupant restraining system in further response to an output from said crush-zone sensor.

3. The apparatus of claim 2 wherein said crush-zone sensor is an accelerometer.

4. The apparatus of claim 1 wherein said crash accelerometer is centrally located within the vehicle having an axis of sensitivity parallel to a front-to-rear axis of the vehicle.

5. A method for controlling a vehicle actuatable occupant restraining system comprising the steps of:
sensing frontal crash acceleration and providing a first crash acceleration signal indicative thereof;
sensing transverse crash acceleration and providing a second crash acceleration signal indicative thereof;
determining a crash velocity value and a crash displacement value in response to the first crash acceleration signal;
comparing the determined crash velocity value as a function of crash displacement value against a threshold value selected as a function of said second crash acceleration value; and
actuating the actuatable occupant restraining system in response to the comparison of the determined crash velocity value as a function of the crash displacement value against the selected threshold value.

6. The method of claim 5 further comprising the steps of sensing crash acceleration at a crush-zone location of the vehicle and actuating said actuatable occupant restraining system in further response to the sensed crash acceleration at the crush-zone location.

7. An apparatus for controlling a vehicle actuatable occupant restraining system comprising:
a crash accelerometer for sensing frontal crash acceleration and providing a first crash acceleration signal indicative thereof;
a crush zone accelerometer sensing crash acceleration and providing a second crash acceleration signal indicative thereof; and
a controller determining a crash velocity value and a crash displacement value in response to the first crash acceleration signal, comparing the determined crash velocity value as a function of crash displacement value against a threshold value selected as a function of said second crash acceleration value, said controller actuating the actuatable occupant restraining system in response to the comparison of the determined crash velocity value as a function of the crash displacement value against the selected threshold value.

8. A method for controlling a vehicle actuatable occupant restraining system comprising the steps of:
sensing frontal crash acceleration and providing a first crash acceleration signal indicative thereof;
sensing crash acceleration at a crush zone location and providing a second crash acceleration signal indicative thereof;
determining a crash velocity value and a crash displacement value in response to the first crash acceleration signal,
comparing the determined crash velocity value as a function of crash displacement value against a threshold value selected as a function of said second crash acceleration value, said controller; and
actuating the actuatable occupant restraining system in response to the comparison of the determined crash velocity value as a function of the crash displacement value against the selected threshold value.

* * * * *